United States Patent
Wang et al.

(10) Patent No.: US 11,068,571 B2
(45) Date of Patent: Jul. 20, 2021

(54) ELECTRONIC DEVICE, METHOD AND SYSTEM OF IDENTITY VERIFICATION AND COMPUTER READABLE STORAGE MEDIUM

(71) Applicant: PING AN TECHNOLOGY (SHENZHEN) CO., LTD., Shenzhen (CN)

(72) Inventors: Jianzong Wang, Shenzhen (CN); Hui Guo, Shenzhen (CN); Jing Xiao, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 477 days.

(21) Appl. No.: 16/084,233

(22) PCT Filed: Aug. 31, 2017

(86) PCT No.: PCT/CN2017/100055
§ 371 (c)(1),
(2) Date: Sep. 12, 2018

(87) PCT Pub. No.: WO2019/019256
PCT Pub. Date: Jan. 31, 2019

(65) Prior Publication Data
US 2021/0097159 A1    Apr. 1, 2021

(30) Foreign Application Priority Data
Jul. 25, 2017 (CN) .......................... 201710614649.6

(51) Int. Cl.
*G06F 21/32* (2013.01)
*G06N 3/04* (2006.01)
(Continued)

(52) U.S. Cl.
CPC ............... *G06F 21/32* (2013.01); *G06N 3/04* (2013.01); *G10L 17/18* (2013.01); *G10L 17/22* (2013.01); *G10L 25/24* (2013.01)

(58) Field of Classification Search
CPC ......... G10L 15/02; G10L 15/16; G10L 17/04; G10L 17/18; G10L 17/00; G10L 15/22;
(Continued)

(56) References Cited

U.S. PATENT DOCUMENTS

| 4,032,711 A | 6/1977 | Sambur |
| 5,583,961 A | 12/1996 | Pawlewski et al. |

(Continued)

FOREIGN PATENT DOCUMENTS

| CN | 103391201 A | 11/2013 |
| CN | 104700018 A | 6/2015 |

(Continued)

OTHER PUBLICATIONS

1st Examination Report of counterpart Australian Standard Patent Application No. 2017404565 dated Oct. 1, 2019.
(Continued)

*Primary Examiner* — Linda Wong

(57) ABSTRACT

An electronic device for identity verification includes a memory and a processor; the system of identity verification is stored in the memory, and executed by the processor to implement: after receiving current voice data of a target user, carrying out framing processing on the current voice data according to preset framing parameters to obtain multiple voice frames; extracting preset types of acoustic features in all the voice frames by using a predetermined filter, and generating multiple observed feature units corresponding to the current voice data according to the extracted acoustic features; pairwise coupling all the observed feature units with pre-stored observed feature units respectively to obtain
(Continued)

multiple groups of coupled observed feature units; inputting the multiple groups of coupled observed feature units into a preset type of identity verification model generated by pre-training to carry out the identity verification on the target user.

12 Claims, 2 Drawing Sheets

(51) Int. Cl.
    *G10L 17/18*     (2013.01)
    *G10L 17/22*     (2013.01)
    *G10L 25/24*     (2013.01)

(58) Field of Classification Search
CPC ....... G10L 25/78; G10L 15/063; G10L 25/30; G10L 15/00; G10L 21/0272; G10L 25/27; G06N 20/00; G06N 3/08; G06N 3/02
See application file for complete search history.

(56) References Cited

U.S. PATENT DOCUMENTS

| | | | |
|---|---|---|---|
| 6,691,090 B1* | 2/2004 | Laurila | G10L 15/02 704/205 |
| 2007/0294083 A1 | 12/2007 | Bellegarda et al. | |
| 2013/0006635 A1* | 1/2013 | Aronowitz | G06N 7/005 704/245 |
| 2016/0217367 A1 | 7/2016 | Moreno et al. | |
| 2018/0166067 A1* | 6/2018 | Dimitriadis | G10L 15/04 |
| 2018/0342250 A1* | 11/2018 | Cohen | G10L 17/00 |
| 2019/0304470 A1* | 10/2019 | Ghaemmaghami | G10L 17/06 |
| 2020/0286489 A1* | 9/2020 | Park | G10L 17/04 |

FOREIGN PATENT DOCUMENTS

| | | |
|---|---|---|
| CN | 106448684 A | 2/2017 |
| CN | 107068154 A | 8/2017 |

OTHER PUBLICATIONS

Kheder, W. B. et al., Probabilistic approach using joint long and short session i-vectors modeling to deal with short utterances for speaker recognition, Proceedings Interspeech 2016, Sep. 8-12, 2016, pp. 1830-1834.

Xiao, X. et al., Feature compensation using linear combination of speaker and environment dependent correction vectors, 2014 IEEE International Conference on Acoustics, Speech and Signal Processing (ICASSP), May 4, 2014, pp. 1720-1724.

Gupta, V. et al., I-vector-based speaker adaptation of deep neural networks for French broadcast audio transcription, 2014 IEEE International Conference on Acoustics, Speech and Signal Processing (ICASSP), May 4, 2014, pp. 6334-6338.

Trevor Hastie et al., Classification by Pairwise Coupling, Advances in Neural Information Processing Systems, Jan. 1, 1998, vol. 10, pp. 1-38.

Extended European Search Report of counterpart European Patent Application No. 17897212.1 dated Mar. 2, 2020.

* cited by examiner

ELECTRONIC DEVICE, METHOD AND SYSTEM OF IDENTITY VERIFICATION AND COMPUTER READABLE STORAGE MEDIUM

CROSS REFERENCE TO RELATED APPLICATIONS

This application is a national phase entry of international application PCT/CN2017/100055, filed on Aug. 31, 2017, which claims priority to Chinese Patent Application No. CN201710614649.6, filed on Jul. 25, 2017 and entitled "Electronic Device, Method of Identity Verification and Computer Readable Storage Medium", which is hereby incorporated by reference in its entirety.

TECHNICAL FIELD

The disclosure relates to the technical field of communications, and more particularly relates to an electronic device, a method and system of identity verification and a computer readable storage medium.

BACKGROUND

Voiceprint recognition is an identity authentication technology for judging a target voice through computer simulation, and may be widely applied to the fields such as the Internet, a bank system and the Public Security and Judicial Administration. At the present, a conventional voiceprint recognition solution is to record voices of a speaker through a universal background model built on the basis of a Gaussian mixture model, carry out difference analysis on the voices, then extract voiceprint features according to differences, and mark the voices through a similarity measure to provide a recognition result. This voiceprint recognition solution is relatively low in recognition error rate for a long recording (for example, a recording lasting 30 seconds and even longer) and good in recognition effect; however, for short recordings (for example, recordings shorter than 30 seconds) widespread in different business scenes, the universal background model framework may not well build a model for subtle differences in these recordings due to limited parameters, resulting in low recognition performance for short voices and high recognition error rate.

SUMMARY

The disclosure aims to provide an electronic device, a method and system of identity verification and a computer readable storage medium, and aims at reducing the error rate of short voice recognition.

To achieve the above objective, an electronic device is provided, including a memory and a processor connected with the memory. The memory stores a system of identity verification, which may be operated in the processor. The system of identity verification is executed by the processor to implement the following steps:

S1, after current voice data of a target user to be subjected to identity verification are received, carrying out framing processing on the current voice data according to preset framing parameters to obtain multiple voice frames;

S2, extracting preset types of acoustic features in all the voice frames by using a predetermined filter, and generating multiple observed feature units corresponding to the current voice data according to the extracted acoustic features;

S3, pairwise coupling all the observed feature units with pre-stored observed feature units respectively to obtain multiple groups of coupled observed feature units;

S4, inputting the multiple groups of coupled observed feature units into a preset type of identity verification model generated by pre-training, and obtaining an output identity verification result to carry out the identity verification on the target user.

To achieve the above objective, a method of identity verification is further provided, including:

S1, after current voice data of a target user to be subjected to identity verification are received, carrying out framing processing on the current voice data according to preset framing parameters to obtain multiple voice frames;

S2, extracting preset types of acoustic features in all the voice frames by using a predetermined filter, and generating multiple observed feature units corresponding to the current voice data according to the extracted acoustic features;

S3, pairwise coupling all the observed feature units with pre-stored observed feature units respectively to obtain multiple groups of coupled observed feature units;

S4, inputting the multiple groups of coupled observed feature units into a preset type of identity verification model generated by pre-training, and obtaining an output identity verification result to carry out the identity verification on the target user.

A computer readable storage medium is further provided, which stores a system of identity verification. The system of identity verification may be executed by at least one processor to implement the following steps:

S1, after current voice data of a target user to be subjected to identity verification are received, carrying out framing processing on the current voice data according to preset framing parameters to obtain multiple voice frames;

S2, extracting preset types of acoustic features in all the voice frames by using a predetermined filter, and generating multiple observed feature units corresponding to the current voice data according to the extracted acoustic features;

S3, pairwise coupling all the observed feature units with pre-stored observed feature units respectively to obtain multiple groups of coupled observed feature units;

S4, inputting the multiple groups of coupled observed feature units into a preset type of identity verification model generated by pre-training, and obtaining an output identity verification result to carry out the identity verification on the target user.

A system of identity verification is further provided, which is stored in a memory, and may be executed by at least one processor to implement the following steps:

S1, after current voice data of a target user to be subjected to identity verification are received, carrying out framing processing on the current voice data according to preset framing parameters to obtain multiple voice frames;

S2, extracting preset types of acoustic features in all the voice frames by using a predetermined filter, and generating multiple observed feature units corresponding to the current voice data according to the extracted acoustic features;

S3, pairwise coupling all the observed feature units with pre-stored observed feature units respectively to obtain multiple groups of coupled observed feature units;

S4, inputting the multiple groups of coupled observed feature units into a preset type of identity verification model generated by pre-training, and obtaining an output identity verification result to carry out the identity verification on the target user.

The disclosure has the beneficial effects that this disclosure firstly carries out the framing processing on the current voice data to obtain the multiple voice frames, then extracts the preset types of acoustic features in all the voice frames by using the predetermined filter, generates the multiple observed feature units corresponding to the current voice data according to the extracted acoustic features, pairwise couples all the observed feature units with pre-stored observed feature units respectively to obtain multiple groups of coupled observed feature units, inputs the multiple groups of coupled observed feature units into the preset type of identity verification model, and obtains the output identity verification result to carry out the identity verification on the target user. When short recordings appearing in various business scenes need to be subjected to identity authentication, this disclosure carries out short recording framing, acoustic feature extraction and conversion of acoustic features into observed feature units, and finally inputs the coupled observed feature units into the identity verification model for identity verification, so that the disclosure is relatively good in short voice recognition performance, and may reduce the recognition error rate.

DETAILED DESCRIPTION OF THE EMBODIMENTS

To make objectives, technical solutions and advantages of the disclosure clearer and more understandable, a further detailed description will be made below in conjunction with accompanying drawings and embodiments. It should be understood that the specific embodiments described herein are merely explanative of this disclosure, but not intended to limit the disclosure. Based on the embodiments in the disclosure, all other embodiments obtained by ordinary persons skilled in the art without paying creative work shall fall within the scope of protection of the disclosure.

It should be noted that descriptions such as "first" and "second" that are involved in the disclosure are intended for descriptive purposes only, but may not be regarded as indicating or implying their relative importance or implicitly indicating the number of technical features. Therefore, features defined by "first" and "second" may explicitly or implicitly include at least one of these features. In addition, the technical solutions among all the embodiments may be combined mutually, but they must be implemented by the ordinary persons skilled the art. If the combinations of the technical solutions have mutual contradictions or may not be implemented, it should deem that these combinations of the technical solutions do not exist, and may not fall within the claimed scope of the disclosure either.

Figure 1:
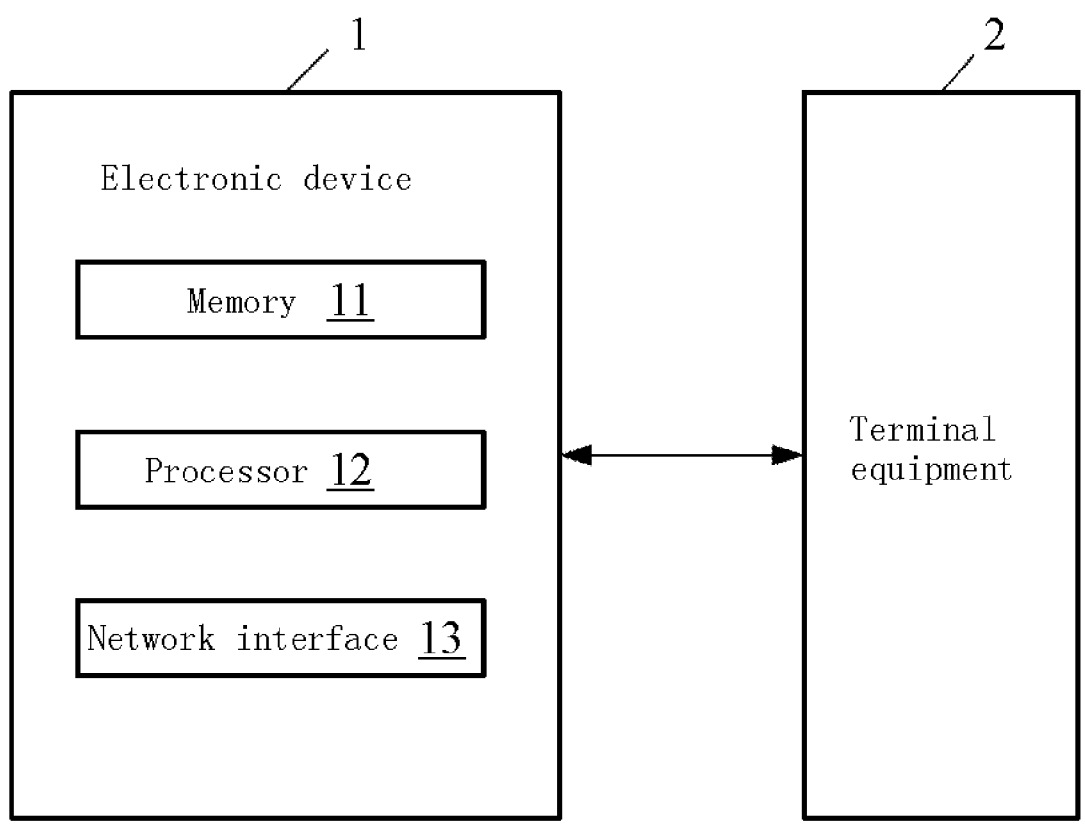
FIG. 1 is a schematic diagram of an optional application environment for all embodiments of the disclosure.

FIG. 1 is an application environment schematic diagram of a preferred embodiment of a method of identity verification of the disclosure. The application environment schematic diagram includes an electronic device 1 and terminal equipment 2. The electronic device 1 may implement data interaction with the terminal equipment 2 through an appropriate technology such as a network and a near field communication technology.

The terminal equipment 2 includes, but not limited to, any electronic product capable of implementing human-machine interaction with a user by means of a keyboard, a mouse, a remote controller, a touch panel or sound control equipment and the like, and this electronic product may collect voice data of a user by using a voice collection device (such as a microphone), for example, mobile equipment such as a personal computer, a flat computer, a smart phone, a Personal Digital Assistant (PDA), a game machine, an Internet Protocol Television (IPTV), intelligent wearable equipment and a navigation device, or fixed terminals such as a digital TV, a desk computer, a notebook computer and a server.

The electronic device 1 is equipment capable of automatically calculating a value and/or processing information according to a preset or pre-stored instruction. The electronic device 1 may be a computer, a single network server, a server group consisting of multiple network servers, or a cloud computing-based cloud consisting of a large number of hosts or network servers, wherein as one of distributed computations, cloud computing is a super virtual computer consisting of a group of loosely-coupled computer sets.

In this embodiment, the electronic device 1 may include, but not limited to, a memory 11, a processor 12 and a network interface 13 which are connected with one another through a system bus in a communicating manner. It should be noted that FIG. 1 only shows the electronic device 1 having assemblies from 11 to 13, but it should be understood that not all the assemblies shown are required to be implemented, and more or fewer assemblies may be implemented instead.

Further, the storage equipment 11 includes an internal memory and at least one type of readable storage medium. The internal memory provides a buffer for operation of the electronic device 1; the readable storage medium may be a non-volatile storage medium, such as a flash memory, a hard disk, a multimedia card, a card type memory (for example a Secure Digital (SD) or DX memory), a Random Access Memory (RAM), a Static Random Access Memory (SRAM), a Read-Only Memory (ROM), an Electrically Erasable Programmable Read-Only Memory (EEPROM), a Programmable Read-Only Memory (PROM), a magnetic memory, a magnetic disk and an optical disk. In some embodiments, the readable storage medium may be an internal storage unit of the electronic device 1, for example, a hard disk of the electronic device 1; in some other embodiments, the non-volatile storage medium also may be external storage equipment of the electronic device 1, for example, a plug-in type hard disk, a Smart Media Card (SMC), an SD card, a Flash Card (FC) and the like which are equipped on the electronic device 1. In this embodiment, the readable storage medium of the storage equipment 11 is generally used for storing an operating system and all types of application software which are installed in the electronic device 1, for example, a program code of a system 10 of identity verification in one embodiment of the disclosure and the like. In addition, the storage equipment 11 may be also used for temporarily storing all types of data which have been output or are about to be output.

The processor 12 in some embodiments may be a Central Processing Unit (CPU), a controller, a micro controller, a micro processor and other data processing chips. The processor 12 is generally used for controlling overall operation of the electronic device 1, for example, executing control and processing related to data interaction or communication with the terminal equipment 2 and the like. In this embodiment, the processor 12 is used for operating the program code stored in the memory 11 or processing data, for example, operating the system of identity verification.

The network interface 13 may include a wireless network interface or a wired network interface. The network interface 13 is generally used for establishing communication connection between the electronic device 1 and other sets of electronic equipment. In this embodiment, the network interface 13 is mainly used for connecting the electronic device 1 with one or multiple sets of terminal equipment 2 to establish a data transmission channel and communication connection between the electronic device 1 and one or multiple sets of terminal equipment 2.

The system of identity verification is stored in the memory 11, and includes at least one computer readable instruction stored in the memory 11. The at least one computer readable instruction may be executed by the processor 12 to implement methods of all embodiments of the application, and may be divided into different logic modules according to different functions realized by all its parts.

In one embodiment, the system of identity verification is executed by the processor 12 to implement the following steps:

S1, after current voice data of a target user to be subjected to identity verification are received, framing processing is carried out on the current voice data according to preset framing parameters to obtain multiple voice frames;

in this embodiment, voices of the user need to be recorded under various business scenes, and during voice recording, the received current voice data are pieces of recording data, which are short voices.

During the voice recording, it should prevent interference of environmental noise and voice collection equipment as much as possible. Voice recording equipment is kept a proper distance away from the user, and use of such voice recording equipment with big distortion is avoided as far as possible. For a power supply, commercial power is preferred, and current needs to be kept stable; and a sensor is used for phone-call recording. Before the framing processing, the voice data may be subjected to de-noising processing to further reduce the interference.

Wherein during the framing processing for each piece of recording data in the current voice data according to the preset framing parameters, the preset framing parameters include framing carried out every 25 milliseconds and frame shifting carried out for 10 milliseconds; and after the framing processing, multiple voice frames are obtained on the basis of each piece of recording data. Of course, this embodiment does not limit the above framing processing mode, so that other modes of carrying out the framing processing based on the framing parameters may be adopted, and all fall within the scope of protection of the embodiment.

S2, preset types of acoustic features in all the voice frames are extracted by using a predetermined filter, and multiple observed feature units corresponding to the current voice data are generated according to the extracted acoustic features;

in this embodiment, the predetermined filter preferably adopts a Mel filter, and the acoustic features are voiceprint features. There are various types of voiceprint features, such as a broadband voiceprint, a narrowband voiceprint and an amplitude voiceprint. The voiceprint features of this embodiment are preferably Mel Frequency Cepstrum Coefficients (MFCCs).

When the multiple observed feature units corresponding to the current voice data are generated according to the acoustic features, feature data matrixes are formed according to the MFCCs. To be more specific, each feature data matrix is formed according to the MFCCs of each piece of recording data, so that the feature data matrixes corresponding to the multiple pieces of recording data are the multiple observed feature units corresponding to the current voice data.

S3, all the observed feature units are pairwise coupled with pre-stored observed feature units to obtain multiple groups of coupled observed feature units;

S4, the multiple groups of coupled observed feature units are input into a preset type of identity verification model generated by pre-training, and an output identity verification result is obtained to carry out the identity verification on the target user.

In this embodiment, a relatively large number of observed feature units of the user are pre-stored; after the multiple observed feature units corresponding to the current voice data are generated, the multiple generated observed feature units are pairwise coupled with the pre-stored observed feature units, so that the multiple groups of coupled observed feature units are obtained.

Wherein the preset type of identity verification model preferably adopts a deep convolution neural network model, and the deep convolution neural network model consists of one input layer, four convolution layers, one pooling layer, two full connected layers, one normalization layer and one scoring layer. The detailed structure of the deep convolution neural network model is as shown in Table 1 below:

TABLE 1

| Layer Name | Batch Size | Kernel Size | Stride Size | Filter Size |
|---|---|---|---|---|
| Input | 128 | 20*9 | 1*1 | 512 |
| Conv1 | 128 | 1*1 | 1*1 | 512 |
| Conv2 | 128 | 1*1 | 1*1 | 512 |
| Conv3 | 128 | 1*1 | 1*1 | 512 |
| Conv4 | 128 | 1*1 | 1*1 | 512 |
| Mean_std_pooling | 128 | \ | \ | \ |
| Full connected | 128 | 1024*512 | \ | \ |
| Full connected | 128 | 512*300 | \ | \ |
| Normalize Wrap | 128 | \ | \ | \ |
| Scoring: | 128 | 300*300, 300*300 | \ | \ | wherein the column of Layer Name represents the name of each layer, Input represents the input layer, Cony represents a convolution layer, Conv1 represents the first convolution layer, Mean_std_pooling represents the pooling layer, Full connected represents the full connected layer, Normalize Wrap represents the normalization layer, and Scoring represents the scoring layer. The column of Batch Size represents the number of observed feature units input into the current layer; the column of Kernel Size represents the size of a convolution kernel of the current layer (for example, the Kernel Size may be equal to 3, which means that the size of the convolution kernel is 3×3); and the column of Stride Size represents a moving step length of the convolution kernel, namely a distance of movement of the convolution kernel subjected to preliminary convolution to a next convolution position. The column of Filter size represents a channel for outputting of each layer, for example, an input voice channel of the Input layer is 1 (namely original data), and is changed into 512 after passing through the channel of the Input layer. To be more specific, the input layer represents sampling of the input observed feature units; the convolution kernel 1*1 of the Cony layer may carry out scaling and feature combination on an input; the Normalize Wrap layer carries out variance normalization on the input; the Scoring layer trains an intra-class relation matrix U of the user and an inter-class relation matrix V of the user, and their dimensions are both 300*300.

In this embodiment, after the multiple groups of coupled observed feature units are input into the deep convolution neural network model, the output identity verification result is obtained; and the output identity verification result includes a verification succeeded result and a verification failed result, so that the identity verification is carried out on the target user.

Compared with the prior art, this embodiment firstly carries out the framing processing on the current voice data to obtain the multiple voice frames, then extracts the preset types of acoustic features in all the voice frames by using the predetermined filter, generates the multiple observed feature units corresponding to the current voice data according to the extracted acoustic features, pairwise couples all the observed feature units with pre-stored observed feature units respectively to obtain multiple groups of coupled observed feature units, inputs the multiple groups of coupled observed feature units into the preset type of identity verification model, and obtains the output identity verification result to carry out the identity verification on the target user. When short recordings appearing in various business scenes need to be subjected to identity authentication, this disclosure carries out short recording framing, acoustic feature extraction and conversion of acoustic features into observed feature units, and finally inputs the coupled observed feature units into the identity verification model for identity verification, so that the disclosure is relatively good in short voice recognition performance, and may reduce the recognition error rate.

In one preferred embodiment, on the basis of the embodiment of FIG. 1, the step that the preset types of acoustic features in all the voice frames are extracted by using the predetermined filter includes:

windowing processing is carried out on the voice frames;

Fourier transformation is carried out on each window to obtain a corresponding frequency spectrum;

the frequency spectrums are input into the Mel filter so as to output Mel frequency spectrums;

cepstrum analysis is carried out on the Mel frequency spectrums to obtain the MFCCs which serve as the acoustic features of the voice frames.

Wherein after the voice data are framed, each frame of data is processed as a stationary signal. As each item needs to be expanded by using Fourier subsequently to obtain Mel frequency spectrum features, the Gibbs effect may be caused, namely after a periodic function (such as a rectangular pulse) having non-continuous points is subjected to Fourier series expansion, finite items are selected for composition; when more items are selected, peaks appearing in a composited waveform are closer to the non-continuous points of an original signal; and when the number of the selected items is extremely large, the peak value tends to be a constant, and is approximately equal to 9 percent of a total jumping value. In order to avoid the Gibbs effect, the windowing processing needs to be carried out on the voice frames to reduce the problem of discontinuity of signals at start and end positions of the voice frames.

Wherein the cepstrum analysis includes logarithm taking and inverse transformation making; the inverse transformation is generally implemented through Discrete Cosine Transformation (DCT), and after DCT is completed, coefficients from 2 to 13 are used as the MFCCs. The MFCCs are the voiceprint features of this frame of voice data; each feature data matrix is formed by the MFCCs of each frame, and this feature data matrix represents the acoustic features of each voice frame.

In one preferred embodiment, on the basis of the above embodiment, the step that the multiple observed feature units corresponding to the current voice data are generated according to the extracted acoustic features includes:

all the voice frames in each recording datum in the current voice data form a voice frame set, 20 dimensions of MFCCs (namely the acoustic features) of each voice frame in the voice frame set are spliced according to the sequence of framing moments of the corresponding voice frames, and the observed feature units of a corresponding (20, N)-dimension matrix are generated, wherein N is the total number of the frames in the voice frame set.

In one preferred embodiment, on the basis of the above embodiment, the deep convolution neural network model carries out the identity verification by adopting a recognition function, and the recognition function includes:

$$Obj = -\sum_{x,y \in same} ln(P(x, y)) - K \sum_{x,y \in diff} ln(1 - P(x, y));$$

$$P(x, y) = \frac{1}{1 + e^{-L(x,y)}};$$

$$L(x, y) = x^T U y - x^T V x - y^T V y + b,$$

where Obj is a target function of the deep convolution neural network model; by maximization of the target function, the probability that the deep convolution neural network model makes a correct judgment is increased to convergence, so that the identity of the target user may be verified; x is a user feature obtained by one observed feature unit in one group of observed feature units on the normalization layer; y is a user feature obtained by the other observed feature unit in the group of observed feature units on the normalization layer; K is a constant; P(x, y) is a calculated probability that one group of observed feature units belong to the same user; L(x, y) is a calculated similarity L of one group of observed feature units; U represents the intra-class relation matrix of the user; V represents the inter-class relation matrix of the user; b represents an offset; and T represents matrix transposition.

Figure 2:
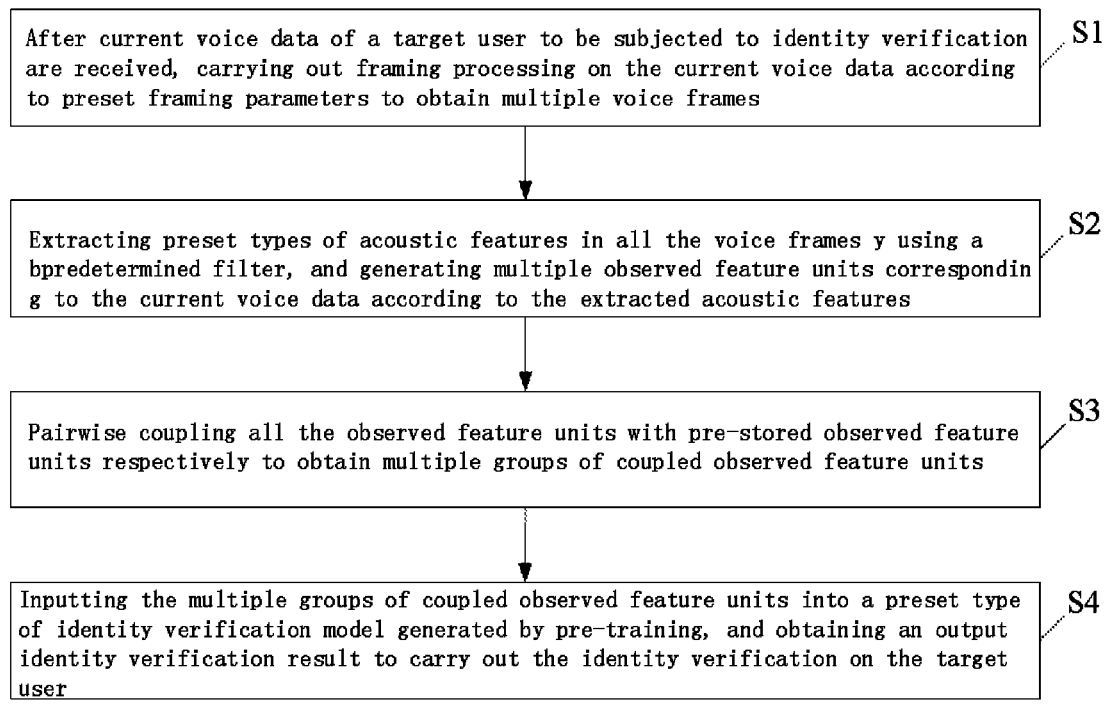
FIG. 2 is a flowchart of one embodiment of a method of identity verification of the disclosure.

FIG. 2 is a flowchart of one embodiment of a method of identity verification of the disclosure. The method of identity verification includes:

S1, after current voice data of a target user to be subjected to identity verification are received, framing processing is carried out on the current voice data according to preset framing parameters to obtain multiple voice frames;

in this embodiment, voices of the user need to be recorded under various business scenes, and during voice recording, the received current voice data are pieces of recording data, which are short voices.

During the voice recording, it should prevent interference of environmental noise and voice collection equipment as much as possible. Voice recording equipment is kept a proper distance away from the user, and use of such voice recording equipment with big distortion is avoided as far as possible. For a power supply, commercial power is preferred, and current needs to be kept stable; and a sensor is used for phone-call recording. Before the framing processing, the voice data may be subjected to de-noising processing to further reduce the interference.

Wherein during the framing processing for each piece of recording data in the current voice data according to the preset framing parameters, the preset framing parameters include framing carried out every 25 milliseconds and frame shifting carried out for 10 milliseconds; and after the framing processing, multiple voice frames are obtained on the basis of each piece of recording data. Of course, this embodiment does not limit the above-mentioned framing processing mode, so that other modes of carrying out the framing processing based on the framing parameters may be adopted, and all fall within the scope of protection of the embodiment.

S2, preset types of acoustic features in all the voice frames are extracted by using a predetermined filter, and multiple observed feature units corresponding to the current voice data are generated according to the extracted acoustic features;

in this embodiment, the predetermined filter preferably adopts a Mel filter, and the acoustic features are voiceprint features. There are various types of voiceprint features, such as a broadband voiceprint, a narrowband voiceprint and an amplitude voiceprint. The voiceprint features of this embodiment are preferably Mel Frequency Cepstrum Coefficients (MFCCs).

When the multiple observed feature units corresponding to the current voice data are generated according to the acoustic features, feature data matrixes are formed according to the MFCCs. To be more specific, each feature data matrix is formed according to the MFCCs of each piece of recording data, so that the feature data matrixes corresponding to the multiple pieces of recording data are the multiple observed feature units corresponding to the current voice data.

S3, all the observed feature units are pairwise coupled with pre-stored observed feature units to obtain multiple groups of coupled observed feature units;

S4, the multiple groups of coupled observed feature units are input into a preset type of identity verification model generated by pre-training, and an output identity verification result is obtained to carry out the identity verification on the target user.

In this embodiment, a relatively large number of observed feature units of the user are pre-stored; after the multiple observed feature units corresponding to the current voice data are generated, the multiple generated observed feature units are pairwise coupled with the pre-stored observed feature units, so that the multiple groups of coupled observed feature units are obtained.

Wherein the preset type of identity verification model preferably adopts a deep convolution neural network model, and the deep convolution neural network model consists of one input layer, four convolution layers, one pooling layer, two full connected layers, one normalization layer and one scoring layer. The detailed structure of the deep convolution neural network model is as shown in Table 1 above, so that no details will be described here.

Wherein the column of Layer Name represents the name of each layer, Input represents the input layer, Cony represents a convolution layer, Conv1 represents the first convolution layer, Mean_std_pooling represents the pooling layer, Full connected represents the full connected layer, Normalize Wrap represents the normalization layer, and Scoring represents the scoring layer. The column of Batch Size represents the number of observed feature units input into the current layer; the column of Kernel Size represents the size of a convolution kernel of the current layer (for example, the Kernel Size may be equal to 3, which means that the size of the convolution kernel is 3×3); and the column of Stride Size represents a moving step length of the convolution kernel, namely a distance of movement of the convolution kernel subjected to preliminary convolution to a next convolution position. The column of Filter size represents a channel for outputting of each layer, for example, an input voice channel of the Input layer is 1 (namely original data), and is changed into 512 after passing through the channel of the Input layer. To be more specific, the input layer represents sampling of the input observed feature units; the convolution kernel 1*1 of the Cony layer may carry out scaling and feature combination on an input; the Normalize Wrap layer carries out variance normalization on the input; the Scoring layer trains an intra-class relation matrix U of the user and an inter-class relation matrix V of the user, and their dimensions are both 300*300.

In this embodiment, after the multiple groups of coupled observed feature units are input into the deep convolution neural network model, the output identity verification result is obtained; and the output identity verification result includes a verification succeeded result and a verification failed result, so that the identity verification is carried out on the target user.

In one preferred embodiment, on the basis of the embodiment of FIG. 2, in the step S2, the step that the preset types of acoustic features in all the voice frames are extracted by using the predetermined filter includes:

windowing processing is carried out on the voice frames;

Fourier transformation is carried out on each window to obtain a corresponding frequency spectrum;

the frequency spectrums are input into the Mel filter so as to output Mel frequency spectrums;

cepstrum analysis is carried out on the Mel frequency spectrums to obtain the MFCCs which serve as the acoustic features of the voice frames.

Wherein after the voice data are framed, each frame of data is processed as a stationary signal. As each item needs to be expanded by using Fourier subsequently to obtain Mel frequency spectrum features, the Gibbs effect may be caused, namely after a periodic function (such as a rectangular pulse) having non-continuous points is subjected to Fourier series expansion, finite items are selected for composition; when more items are selected, peaks appearing in a composited waveform are closer to the non-continuous points of an original signal; and when the number of the selected items is extremely large, the peak value tends to be a constant, and is approximately equal to 9 percent of a total jumping value. In order to avoid the Gibbs effect, the windowing processing needs to be carried out on the voice frames to reduce the problem of discontinuity of signals at start and end positions of the voice frames.

Wherein the cepstrum analysis includes logarithm taking and inverse transformation making; the inverse transformation is generally implemented through Discrete Cosine Transformation (DCT), and after DCT is completed, coefficients from 2 to 13 are used as the MFCCs. The MFCCs are the voiceprint features of this frame of voice data; each feature data matrix is formed by the MFCCs of each frame, and this feature data matrix represents the acoustic features of each voice frame.

In one preferred embodiment, on the basis of the above embodiment, in the step S2, the step that the multiple observed feature units corresponding to the current voice data are generated according to the extracted acoustic features includes: all the voice frames in each recording datum in the current voice data form a voice frame set, 20 dimensions of MFCCs (namely the acoustic features) of each voice frame in the voice frame set are spliced according to the sequence of framing moments of the corresponding voice frames, and the observed feature units of a corresponding (20, N)-dimension matrix are generated, wherein N is the total number of the frames in the voice frame set.

In one preferred embodiment, on the basis of the above embodiment, the deep convolution neural network model carries out the identity verification by adopting a recognition function, and the recognition function includes:

$$Obj = -\sum_{x,y \in same} ln(P(x, y)) - K \sum_{x,y \in diff} ln(1 - P(x, y));$$

$$P(x, y) = \frac{1}{1 + e^{-L(x,y)}};$$

$$L(x, y) = x^T U y - x^T V x - y^T V y + b,$$

where Obj is a target function of the deep convolution neural network model; by maximization of the target function, the probability that the deep convolution neural network model makes a correct judgment is increased to convergence, so that the identity of the target user may be verified; x is a user feature obtained by one observed feature unit in one group of observed feature units on the normalization layer; y is a user feature obtained by the other observed feature unit in the group of observed feature units on the normalization layer; K is a constant; P(x, y) is a calculated probability that one group of observed feature units belong to the same user; L(x, y) is a calculated similarity L of one group of observed feature units; U represents the intra-class relation matrix of the user; V represents the inter-class relation matrix of the user; b represents an offset; and T represents matrix transposition.

In one preferred embodiment, on the basis of the above embodiment, before the step S4, the method further includes:

a first preset number of voice pairs of the same user are obtained, for example, 1,000 users are obtained, and each user obtains 1,000 voice pairs; each voice pair consists of two pieces of voices of two different pronunciation contents corresponding to the same user; a second preset number of voice pairs of different users are obtained, for example, 1,000 users are obtained; all the users are pairwise coupled; and one voice pair is obtained by the same pronunciation content corresponding to each pair of users. The framing processing is carried out on voices in all the voice pairs respectively according to the preset framing parameters; the preset framing parameters include framing every 25 milliseconds and frame shifting for 10 milliseconds to obtain the multiple voice frames corresponding to all the voice pairs;

the preset types of acoustic features (for example, 20 dimensions of MFCC frequency spectrum features) in all the voice frames are extracted by using the predetermined filter (for example the Mel filter), and the multiple observed feature units of all the voice pairs are generated according to the extracted acoustic features, namely the multiple feature data matrixes are formed according to the MFCCs, and the feature data matrixes are the observed feature units;

the observed feature units corresponding to two voices belonging to the same user and two voices belonging to different users are pairwise coupled to obtain the multiple groups of coupled observed feature units;

each voice is dichotomized into a first percent (for example 70 percent) of a training set and a second percent (for example 20 percent) of a verification set, wherein the sum of the first percent and the second percent is less than or equal to 1;

a deep convolution neural network model is trained by using all the groups of observed feature units of all the voice pairs in the training set, and after the training is completed, the accuracy of the trained deep convolution neural network model is verified by using the verification set;

if the accuracy is greater than a preset threshold value (for example 98.5 percent), after the training is completed, the trained deep convolution neural network model is used as the deep convolution neural network model in the step S4, or if the accuracy is less than or equal to the preset threshold value, the number of the voice pairs for training is increased, and the above step is re-executed for retraining till the accuracy of the trained deep convolution neural network model is greater than the preset threshold value.

A computer readable storage medium is further provided, which stores a system of identity verification. The system of identity verification is executed by a processor to implement the steps of the above-mentioned method of identity verification.

The numbering of the above-mentioned embodiments of the disclosure is intended for illustrative purposes only, and is not indicative of the pros and cons of these embodiments.

By the description of the above-mentioned implementation modes, it will be evident to those skilled in the art that the methods according to the above embodiments can be implemented by means of software and a necessary general-purpose hardware platform; they can of course be implemented by hardware, but in many cases the former will be more advantageous. Based on such an understanding, the essential technical solution of the disclosure, or the portion that contributes to the prior art may be embodied as software products. Computer software products can be stored in a storage medium (such as an ROM/RAM, a magnetic disk and an optical disc) and may include multiple instructions enabling a set of terminal equipment (which may be a mobile phone, a computer, a server, an air conditioner, or network equipment and the like) to execute the methods described in the various embodiments of the disclosure.

The above embodiments are only preferred embodiments of the disclosure, but not intended to limit the patent scope of the disclosure, and equivalent structures or equivalent process transformations that are made on the basis of the description of the disclosure and contents of the drawings, directly or indirectly applied to other relevant technical fields shall all similarly fall within the scope of patent protection of the disclosure.

What is claimed is:

1. An electronic device, comprising a memory and a processor connected with the memory, wherein the memory stores a system of identity verification operated in the processor, and the system of identity verification is executed by the processor to implement the following steps:

S1, after a current voice data of a target user to be subjected to an identity verification is received, carrying out a framing processing on the current voice data according to preset framing parameters to obtain multiple voice frames;

S2, extracting preset types of acoustic features in all the voice frames by using a predetermined filter, and generating multiple observed feature units corresponding to the current voice data according to the extracted acoustic features;

S3, pairwise coupling all the observed feature units with pre-stored observed feature units respectively to obtain multiple groups of coupled observed feature units;

S4, inputting the multiple groups of coupled observed feature units into a preset type of identity verification model generated by pre-training, and obtaining an output identity verification result to carry out the identity verification on the target user;

wherein the preset type of identity verification model generated by pre-training is a deep convolution neural network model to carry out the identity verification by adopting a recognition function, and the recognition function comprises:

$$Obj = -\sum_{x,y \in same} ln(P(x, y)) - K \sum_{x,y \in diff} ln(1 - P(x, y));$$

$$P(x, y) = \frac{1}{1 + e^{-L(x,y)}};$$

$$L(x, y) = x^T U y - x^T V x - y^T V y + b,$$

where Obj is a target function of the deep convolution neural network model; x is a user feature obtained by one observed feature unit in one group of observed feature units on a normalization layer; y is a user feature obtained by the other observed feature unit in the group of observed feature units on the normalization layer; K is a constant; P(x, y) is a calculated probability that one group of observed feature units belong to the same user; L(x, y) is a calculated similarity L of one group of observed feature units; U represents an intra-class relation matrix of the user; V represents an inter-class relation matrix of the user; b represents an offset; and T represents matrix transposition.

2. The electronic device of claim 1, wherein the predetermined filter is a Mel filter, and the step of extracting the preset types of acoustic features in all the voice frames by using the predetermined filter comprises:

carrying out a windowing processing on the voice frames;
carrying out a fourier transformation on each window to obtain a corresponding frequency spectrum;
inputting the frequency spectrums into the Mel filter so as to output Mel frequency spectrums;
carrying out cepstrum analysis on the Mel frequency spectrums to obtain Mel Frequency Cepstrum Coefficients (MFCCs), wherein the Mel Frequency Cepstrum Coefficients serve as the acoustic features of the voice frames.

3. The electronic device of claim 2, wherein the step of generating the multiple observed feature units corresponding to the current voice data according to the extracted acoustic features comprises:

forming a voice frame set by all the voice frames in each recording datum in the current voice data, splicing 20 dimensions of MFCCs of each voice frame in the voice frame set according to the sequence of framing moments of the corresponding voice frames, and generating the observed feature units of a corresponding (20, N)-dimension matrix, wherein N is a total number of the frames in the voice frame set.

4. The electronic device of claim 3, wherein before the step S4, the processor implements the following steps:

obtaining a first preset number of voice pairs of the same user, and obtaining a second preset number of voice pairs of different users, and carrying out the framing processing on voices in all the voice pairs respectively according to the preset framing parameters to obtain multiple voice frames corresponding to all the voice pairs;

extracting preset types of acoustic features in all the voice frames by using the predetermined filter, and generating multiple observed feature units of all the voice pairs according to the extracted acoustic features;

pairwise coupling the observed feature units corresponding to two voices belonging to the same user and two voices belonging to different users to obtain the multiple groups of coupled observed feature units;

dichotomizing each voice into a first percent of a training set and a second percent of a verification set, wherein the sum of the first percent and the second percent is less than or equal to 1;

training a deep convolution neural network model by using all the groups of observed feature units of all the voice pairs in the training set, and after the training is completed, verifying the accuracy of the trained deep convolution neural network model by using the verification set;

if the accuracy is greater than a preset threshold value, after the training is completed, taking the trained deep convolution neural network model as the deep convolution neural network model in the step S4, or if the accuracy is less than or equal to the preset threshold value, increasing the number of the voice pairs for training for retraining.

5. A method of an identity verification, comprising:

S1, after a current voice data of a target user to be subjected to the identity verification is received, carrying out a framing processing on the current voice data according to preset framing parameters to obtain multiple voice frames;

S2, extracting preset types of acoustic features in all the voice frames by using a predetermined filter, and generating multiple observed feature units corresponding to the current voice data according to the extracted acoustic features;

S3, pairwise coupling all the observed feature units with pre-stored observed feature units respectively to obtain multiple groups of coupled observed feature units;

S4, inputting the multiple groups of coupled observed feature units into a preset type of identity verification model generated by pre-training, and obtaining an output identity verification result to carry out the identity verification on the target user;

wherein the preset type of identity verification model generated by pre-training is a deep convolution neural network model to carry out the identity verification by adopting a recognition function, and the recognition function comprises:

$$Obj = -\sum_{x,y \in same} ln(P(x, y)) - K \sum_{x,y \in diff} ln(1 - P(x, y));$$

$$P(x, y) = \frac{1}{1 + e^{-L(x,y)}};$$

$$L(x, y) = x^T U y - x^T V x - y^T V y + b,$$

where Obj is a target function of the deep convolution neural network model; x is a user feature obtained by one observed feature unit in one group of observed feature units on a normalization layer; y is a user feature obtained by the other observed feature unit in the group of observed feature units on the normalization layer; K is a constant; P(x, y) is a calculated probability that one group of observed feature units belong to the same user; L(x, y) is a calculated similarity L of one group of observed feature units; U represents an intra-class relation matrix of the user; V represents an inter-class relation matrix of the user; b represents an offset; and T represents matrix transposition.

6. The method of identity verification of claim 5, wherein the predetermined filter is a Mel filter, and the step of extracting the preset types of acoustic features in all the voice frames by using the predetermined filter comprises:
carrying out a windowing processing on the voice frames;
carrying out a fourier transformation on each window to obtain a corresponding frequency spectrum;
inputting the frequency spectrums into the Mel filter so as to output Mel frequency spectrums;
carrying out cepstrum analysis on the Mel frequency spectrums to obtain Mel Frequency Cepstrum Coefficients (MFCCs), wherein the Mel Frequency Cepstrum Coefficients serve as the acoustic features of the voice frames.

7. The method of identity verification of claim 6, wherein the step of generating the multiple observed feature units corresponding to the current voice data according to the extracted acoustic features comprises:
forming a voice frame set by all the voice frames in each recording datum in the current voice data, splicing 20 dimensions of MFCCs of each voice frame in the voice frame set according to the sequence of framing moments of the corresponding voice frames, and generating the observed feature units of a corresponding (20, N)-dimension matrix, wherein N is a total number of the frames in the voice frame set.

8. The method of identity verification of claim 7, wherein before the step S4, the method further comprises:
obtaining a first preset number of voice pairs of the same user, and obtaining a second preset number of voice pairs of different users, and carrying out the framing processing on voices in all the voice pairs respectively according to the preset framing parameters to obtain multiple voice frames corresponding to all the voice pairs;
extracting preset types of acoustic features in all the voice frames by using the predetermined filter, and generating multiple observed feature units of all the voice pairs according to the extracted acoustic features;
pairwise coupling the observed feature units corresponding to two voices belonging to the same user and two voices belonging to different users to obtain the multiple groups of coupled observed feature units;
dichotomizing each voice into a first percent of a training set and a second percent of a verification set, wherein the sum of the first percent and the second percent is less than or equal to 1;
training a deep convolution neural network model by using all the groups of observed feature units of all the voice pairs in the training set, and after the training is completed, verifying the accuracy of the trained deep convolution neural network model by using the verification set;
if the accuracy is greater than a preset threshold value, after the training is completed, taking the trained deep convolution neural network model as the deep convolution neural network model in the step S4, or if the accuracy is less than or equal to the preset threshold value, increasing the number of the voice pairs for training for retraining.

9. A non-transitory computer readable storage medium, which stores a system of identity verification, wherein the system of identity verification is executed by at least one processor to implement the following steps:
S1, after a current voice data of a target user to be subjected to an identity verification is received, carrying out a framing processing on the current voice data according to preset framing parameters to obtain multiple voice frames;
S2, extracting preset types of acoustic features in all the voice frames by using a predetermined filter, and generating multiple observed feature units corresponding to the current voice data according to the extracted acoustic features;
S3, pairwise coupling all the observed feature units with pre-stored observed feature units respectively to obtain multiple groups of coupled observed feature units;
S4, inputting the multiple groups of coupled observed feature units into a preset type of identity verification model generated by pre-training, and obtaining an output identity verification result to carry out the identity verification on the target user;
wherein the preset type of identity verification model generated by pre-training is a deep convolution neural network model to carry out the identity verification by adopting a recognition function, and the recognition function comprises:

$$Obj = - \sum_{x,y \in same} ln(P(x, y)) - K \sum_{x,y \in diff} ln(1 - P(x, y));$$

$$P(x, y) = \frac{1}{1 + e^{-L(x,y)}};$$

$$L(x, y) = x^T U y - x^T V x - y^T V y + b,$$

where Obj is a target function of the deep convolution neural network model; x is a user feature obtained by one observed feature unit in one group of observed feature units on a normalization layer; y is a user feature obtained by the other observed feature unit in the group of observed feature units on the normalization layer; K is a constant; P(x, y) is a calculated probability that one group of observed feature units belong to the same user; L(x, y) is a calculated similarity L of one group of observed feature units; U represents an intra-class relation matrix of the user; V represents an inter-class relation matrix of the user; b represents an offset and T represents matrix transposition.

10. The non-transitory computer readable storage medium of claim 9, wherein the predetermined filter is a Mel filter, and the step of extracting the preset types of acoustic features in all the voice frames by using the predetermined filter comprises:
carrying out a windowing processing on the voice frames;
carrying out a fourier transformation on each window to obtain a corresponding frequency spectrum;
inputting the frequency spectrums into the Mel filter so as to output Mel frequency spectrums;
carrying out cepstrum analysis on the Mel frequency spectrums to obtain Mel Frequency Cepstrum Coefficients (MFCCs), wherein the Mel Frequency Cepstrum Coefficients serve as the acoustic features of the voice frames.

11. The non-transitory computer readable storage medium of claim 10, wherein the step of generating the multiple observed feature units corresponding to the current voice data according to the extracted acoustic features comprises:
  forming a voice frame set by all the voice frames in each recording datum in the current voice data, splicing 20 dimensions of MFCCs of each voice frame in the voice frame set according to the sequence of framing moments of the corresponding voice frames, and generating the observed feature units of a corresponding (20, N)-dimension matrix, wherein N is a total number of the frames in the voice frame set.

12. The non-transitory computer readable storage medium of claim 11, wherein before the step S4, the method further comprises:
  obtaining a first preset number of voice pairs of the same user, and obtaining a second preset number of voice pairs of different users, and carrying out the framing processing on voices in all the voice pairs respectively according to the preset framing parameters to obtain multiple voice frames corresponding to all the voice pairs;
  extracting preset types of acoustic features in all the voice frames by using the predetermined filter, and generating multiple observed feature units of all the voice pairs according to the extracted acoustic features;
  pairwise coupling the observed feature units corresponding to two voices belonging to the same user and two voices belonging to different users to obtain the multiple groups of coupled observed feature units;
  dichotomizing each voice into a first percent of a training set and a second percent of a verification set, wherein the sum of the first percent and the second percent is less than or equal to 1;
  training a deep convolution neural network model by using all the groups of observed feature units of all the voice pairs in the training set, and after the training is completed, verifying the accuracy of the trained deep convolution neural network model by using the verification set;
  if the accuracy is greater than a preset threshold value, after the training is completed, taking the trained deep convolution neural network model as the deep convolution neural network model in the step S4, or if the accuracy is less than or equal to the preset threshold value, increasing the number of the voice pairs for training for retraining.

* * * * *